United States Patent Office 3,203,176
Patented Aug. 31, 1965

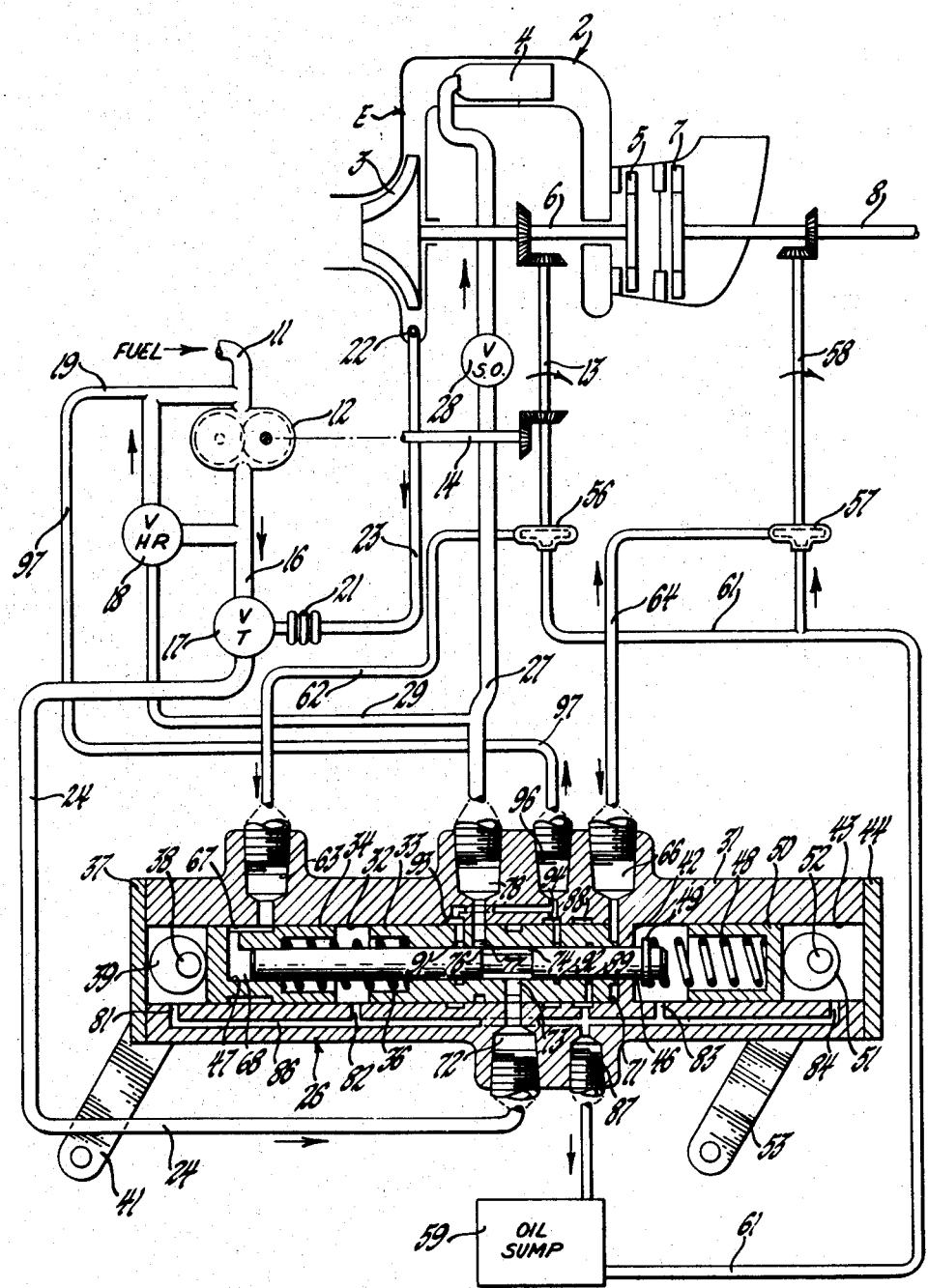

3,203,176
ENGINE GOVERNOR
Richard M. Zeek, Utica, Mich., assignor to General Motors Corporation, Detroit, Mich., a corporation of Delaware
Filed Aug. 23, 1962, Ser. No. 219,071
9 Claims. (Cl. 60—39.16)

My invention relates to control of engines and particularly to governing means for gas turbine engines having independently rotatable turbines, but the invention may be regarded more generally as a governor responsive to two different speed inputs.

Many gas turbine engines have two independently rotatable turbines and require a control sensitive to speeds of both turbines. For example, the well-known engines of the free turbine type include a turbine driving the compressor, which is commonly called a gas generator turbine, and a second or power turbine driving the engine output shaft and energized by the gas discharged from the gas generator. As is well known, the power level of such an engine may be controlled by governing the speed of the gas generator. It may also be desirable to govern the speed of the driven shaft and it is necessary to provide some means to prevent hazardous overspeed of either turbine.

The fuel supply to such an engine may be handled by a fuel control system involving primarily a fuel metering valve or fuel regulator which may be regarded essentially as a throttling valve and which ordinarily may respond to a control input and which nearly always includes apparatus responsive to engine air flow or related controlling parameters to prevent the engine fuel flow from departing from an operating range. This operating range represents the range between the minimum amount of fuel which will sustain operation of the engine and the maximum amount of fuel below what would overheat the engine. Other factors may be involved; but many such controls are known and my invention is not concerned with such fuel metering means. In general, the fuel control system must include a governor as well as a metering means, with the result that ordinarily the governor controls fuel during steady state running of the engine and the metering means primarily assures continued safe operation of the engine during transients such as acceleration and deceleration.

My invention is concerned primarily with providing a simple and highly desirable arrangement of governing means responsive to the speed of the two turbines, preferably including means for setting speeds for both turbines so that the gas generator speed setting may act as a power setting and the power turbine setting may act either as the basic control of engine output speed or as a safety limiter. A relationship of two governors to effect this type of control is known as, for example in the system described in United States application Serial No. 854,688, filed November 23, 1959. In the system described in that application, two somewhat independent speed responsive devices which act as governors are driven by two turbines. One of these governors acts to reset the other by means of a mechanical linkage. My invention is directed to obtaining the advantage of such reset governing means in a relatively simple and compact structure.

The nature of the invention and the advantages thereof will be apparent to those skilled in the art from the accompanying drawing, which is a schematic diagram of a gas turbine and its fuel system incorporating my governing means.

The engine E, which may be of any suitable type having independently rotatable turbines, is indicated in FIGURE 1 as being of a known type in which the gas generator 2 includes a centrifugal compressor 3, combustion apparatus 4, and a high pressure turbine 5 connected to the compressor through a shaft 6. The low pressure or power turbine 7 drives a power output shaft 8 which may drive, for example, a propeller, a lifting rotor, or a vehicle.

Fuel is supplied from any suitable source at low pressure through a line 11 to a pump 12 driven by the gas generator through shafts 13 and 14. The output of the pump is divided between a line 16 to the engine fuel metering or throttling valve 17 and a head regulating valve 18 which operates to contain constant pressure across the fuel metering and governing means and returns excess pumped fuel to the pump inlet through line 19. The valve 17 may be controlled in any usual manner. Control in response to engine conditions is symbolized on the drawing by a bellows 21 coupled to the fuel metering valve actuated by pressure picked up by a probe 22 in the diffuser or scroll of the compressor and communicated through a line 23. From the metering valve 17 the fuel flows through a conduit 24, a governor valve 26 according to the invention, and a conduit 27 incorporating a shut-off valve 28 to the combustion apparatus 4. A tap 29 from the line 27 supplies a sense of fuel pressure downstream of the metering and governing valves to the head regulating valve 18. This valve responds to this pressure and to pump discharge pressure and maintains a constant difference between the two by bleeding fuel to the pump inlet.

The governor valve 26 comprises a body 31 defining a cylinder 32, a sleeve 33 and an annular spring abutment 34 within the cylinder, and a compression spring 36 received in recesses in the sleeve and abutment and biasing them apart. One end of cylinder 32 is closed by a head 37. Between the head and the spring abutment 34, a transverse shaft 38 mounts a power turbine speed setting cam 39. Shaft 38 and cam 39 are moved by an arm 41 which may be a manual engine speed output or power turbine speed setting means. The other end of cylinder 32 is partially closed by an annular shoulder 42 between the cylinder and a second cylinder or bore 43 in the body 31, the end of which is closed by a head 44. The valve includes a valve spool 46 which is slidably mounted in the shoulder 42, in a central bore of the sleeve 33, and in a bore 47 in the abutment 34. Spool 46 is biased by compression spring 48 engaging a flange 49 on the spool and received in a cup-shaped slider 50 reciprocable in the bore 43. The slider 50 is adjusted, similarly to abutment 34, by a cam 51 on a shaft 52 rotated by a manually controllable gas generator speed setting or engine power control arm 53.

Valve sleeve 33 and spool 46 cooperate to define a governor valve which throttles flow between the lines 24 and 27. This valve responds to the speed settings communicated to the sleeve from abutment 47 through speeder spring 36 and to the spool from the slider 50 through speeder spring 48.

The turbine speed inputs are in the form of pressures supplied by suitable speed-responsive pressure generators or transmitters. As illustrated, the speed-responsive devices are a small centrifugal pump 56 driven through shaft 13 by the gas generator and a small centrifugal pump 57 driven through shaft 58 by the power turbine 7. Both of these pumps are supplied with oil from a sump 59 through a line 61. It is well known that such centrifugal pumps generate a delivery pressure approximately proportional to the square of the speed of rotation. These may be taken as exemplary of pressure generators or transmitters to supply the speed inputs to the governor valve 26. Pump 56 is connected through a pressure line 62 to port 63 in the valve body and pump 57 is connected through pressure line 64 to port 66 in the body. Port 63 communicates through the body and through a longitudinal slot 67 in the abutment 34 to a chamber 68 in the abutment where the pressure is exerted against the left-hand end of spool 46 tending to bias the spool so as to lift the flange 49 from the shoulder 42 against the force of spring 48. Thus, the spool is biased in response to gas generator speed. Port 66 communicates with the space 71 between flange 42 and the right-hand end of sleeve 33, the pressure from pump 57 thus tending to lift the sleeve 33 from shoulder 42 against the force of spring 36.

The fuel inlet line 24 enters the governor through a port 72 which is constantly in communication with a port 73 in the sleeve which delivers the fuel to the annular space 74 defined by the sleeve and by the reduced diameter portion of spool 46. The fuel is throttled between the shoulder 76 on the spool and the edge of an annular recess 77 in the sleeve which communicates with port 78 in the body to which the fuel outlet line 27 connects. The area of this fuel throttling opening between the shoulder 76 and the edge of port 77 depends upon the positions of the spool and the sleeve. This may be explained further by consideration of the operation of the governor valve. Assuming governing in response to speed of the gas generator governor, the pressure representing the speed of turbine 5 biases the spool 46 against the spring 48 and the spool will adopt a position with flange 49 clear of shoulder 42 where the speed pressure and the spring force balance each other. Changing the speed setting will alter the spring force, opening or closing the valve until the change in turbine speed has brought the valve back to the appropriate opening for steady state operation at the new speed.

As long as the power turbine does not overspeed, sleeve 33 remains fixed. However, if the power turbine overspeeds, the pressure from speed responsive device 57 will move the sleeve to the left, thereby throttling fuel. This causes a reduction in gas generator speed, a corresponding reduction in pressure in chamber 68 against spool 46, and spool 46 moves to the left establishing a new governing position at a new speed setting of the gas generator governor. It will be noted that this is not the setting called for by the manually controlled arm 53 but a lower setting caused by the shift of spool 33 which involves a resetting of the gas generator governor in response to power turbine overspeed. Looked at in another way, the movement of sleeve 33 to the left, so far as the gas generator governor is concerned, is equivalent to a movement of the speeder spring setting slider 50 to the right. Either calls for a lower gas generator speed. The simplicity of this arrangement for resetting the gas generator governor will be apparent. It is also possible to control primarily by the power turbine governor by setting the gas generator governor to such a high speed relative to the power turbine governor that the power turbine will overspeed in the absence of some unusual load. In this case, the power turbine governor normally will remain unseated and will reset the gas generator governor so as to follow any changes in power turbine output speed and correct fuel flow accordingly. On the other hand, if the power turbine governor is used only as a safety governor in case of overspeed, sleeve 33 will remain fixed except during a hazardous overspeed and will then act as previously explained to reduce fuel.

It should be pointed out that the centrifugal pumps 56 and 57 are merely illustrative of devices for transmitting a speed sense in the form of pressure. Many other devices could be used for this purpose, including the speed sensor described in United States Patent No. 3,039,315.

Arrangements to drain seepage of oil and fuel from the governor valve should be mentioned. Oil may leak into the spaces in the valve drained by the ports 81, 82, 83, and 84. These are connected by a longitudinal passage 86 in the valve body to a drain port 87 connected to the oil sump. Oil also is drained from an annulus 88 around the sleeve and an annulus 89 between the sleeve and the spool through port 87. Likewise, the fuel tending to leak from the governor valve adjacent port 76 is caught in recesses 91 and 92 within the sleeve at each side of the recess of the spool and in recesses 93 and 94 in the valve body. Recess 91 is connected to recess 93 and recess 92 to recess 94, and recesses 93 and 94 are connected to a drain port 96 in the body connecting to a return line 97 leading to the pump inlet.

It will be apparent to those skilled in the art that the structure described provides a very simple and reliable type of mechanism for controlling a turbine engine having independently rotatable turbines. Obviously, many modifications may be made in this system, and particularly in valve structure, without departing from the principles of the invention.

I claim:

1. In a fuel controlling system for a gas turbine engine including independently rotatable turbines and engine fuel regulating means; engine governing means responsive to the speed of both turbines and effective to limit engine fuel upon overspeed of either turbine comprising, in combination, a body defining a cylinder, a sleeve reciprocably mounted in the cylinder, a spring abutment adjustable in the cylinder, a first spring connecting the abutment and sleeve, a valve spool reciprocably mounted in the sleeve, a slider adjustable in the cylinder, a second spring connecting the spool and slider; first means transmitting a first pressure representative of the speed of one turbine, second means transmitting a second pressure representative of the speed of the other turbine, means in the body communicating the first pressure to one end of the sleeve so as to bias it in opposition to the first spring, means in the body and abutment communicating the second pressure to one end of the spool so as to bias the spool in opposition to the second spring, the pressure biases on the sleeve and spool being in opposite directions; and valve port means defined by the sleeve and spool connected in series with the said engine fuel regulating means.

2. In a fuel controlling system for a gas turbine engine including independently rotatable turbines and engine fuel regulating means; engine governing means responsive to the speed of both turbines and effective to limit engine fuel upon overspeed of either turbine comprising, in combination, a body defining a cylinder, a sleeve reciprocably mounted in the cylinder, an annular spring abutment adjustable in the cylinder, a first spring connecting the abutment and sleeve, a valve spool reciprocably mounted in the sleeve and in the abutment, a slider adjustable in the cylinder, a second spring connecting the spool and slider; first means transmitting a first pressure representative of the speed of one turbine, second means transmitting a second pressure representative of the speed of the other turbine, means in the body communicating the first pressure to one end of the sleeve so as to bias it in opposition to the first spring, means in the body and abutment communicating the second pressure into the abutment against the end of the spool extending within the abutment so as to bias the spool in opposition to the second spring, the pressure biases on the sleeve and spool being in opposite directions; and valve port means defined by the sleeve and spool connected in series with the said engine fuel regulating means.

3. A system as recited in claim 2 in which the springs are compressed between the sleeve and the abutment and between the spool and the slider, respectively.

4. An engine governor for an engine having independently rotatable elements comprising, in combination, a first member movable in response to departure of the speed of one element from a preset value, a second member movable in response to departure of the speed of the other element from a preset value, a valve including a first valve part connected to the first member and a second valve part connected to the second member, the said valve parts coacting to define a variable valve port and being moved in opposite directions in response to overspeed of the respective elements, and means for conducting an energizing medium to the engine controlled by the valve port so that the valve parts coact with each other to cause throttling of the energizing medium upon overspeed of either element.

5. A combination as recited in claim 4 in which the said elements are turbines and the energizing medium is engine fuel.

6. An engine governor for an engine having independently rotatable elements comprising, in combination, a cylinder, a first member movable within the cylinder including means operated in response to departure of the speed of one element from a preset value, a second member movable within the cylinder and within the first member including means operated in response to departure of the speed of the other element from a preset value, a valve including a first valve part on the first member and a second valve part on the second member, the said valve parts coacting to define a variable valve port and being moved in opposite directions in response to overspeed of the respective elements, and means for conducting an energizing medium to the engine controlled by the valve port so that the valve parts coact with each other to cause throttling of the energizing medium upon overspeed of either element.

7. A combination as recited in claim 6 in which the said elements are turbines and the energizing medium is engine fuel.

8. An engine governor for an engine having independently rotatable elements comprising, in combination, a first piston movable in response to a pressure representing departure of the speed of one element from a preset value, a second piston movable in response to a pressure representing departure of the speed of the other element from a preset value and coaxial with the first piston, a valve including a first valve part on the first piston and a second valve part on the second piston, the said valve parts coacting to define a variable valve port and being moved in opposite directions in response to overspeed of the respective elements, and means for conducting an energizing medium to the engine controlled by the valve port so that the valve parts coact with each other to cause throttling of the energizing medium upon overspeed of either element.

9. A combination as recited in claim 8 in which the said elements are turbines and the energizing medium is engine fuel.

References Cited by the Examiner

UNITED STATES PATENTS

| | | | |
|---|---|---|---|
| 2,856,754 | 10/58 | Torell | 60—39.28 |
| 2,933,887 | 4/60 | Davies | 60—39.28 |

FOREIGN PATENTS 771,077  3/57  Great Britain.

SAMUEL LEVINE, *Primary Examiner.*

ABRAM BLUM, *Examiner.*